United States Patent
Dunstan

(10) Patent No.: US 6,876,310 B2
(45) Date of Patent: Apr. 5, 2005

(54) METHOD AND APPARATUS TO LOCATE A DEVICE IN A DWELLING OR OTHER ENCLOSED SPACE

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 09/966,920

(22) Filed: Sep. 27, 2001

(65) Prior Publication Data

US 2003/0058269 A1 Mar. 27, 2003

(51) Int. Cl.$^7$ .............................................. H04Q 1/00
(52) U.S. Cl. ............................ 340/825.49; 340/825.72; 340/5.53; 340/7.1; 455/456.3; 342/357.09
(58) Field of Search ....................... 340/825.69, 825.72, 340/825.22, 5.53, 825.49, 5.28, 7.1; 455/456.1, 456.3; 342/357.09

(56) References Cited

U.S. PATENT DOCUMENTS

| | | | | |
|---|---|---|---|---|
| 5,119,504 A | * | 6/1992 | Durboraw, III | 455/456.1 |
| 5,223,844 A | * | 6/1993 | Mansell et al. | 340/825.49 |
| 5,386,478 A | * | 1/1995 | Plunkett | 381/103 |
| 5,408,238 A | * | 4/1995 | Smith | 342/357.09 |
| 5,506,717 A | * | 4/1996 | Kho | 398/151 |
| 6,081,199 A | * | 6/2000 | Hogl | 340/5.28 |
| 6,429,769 B1 | * | 8/2002 | Fulgueira | 340/825.69 |
| 6,650,894 B1 | * | 11/2003 | Berstis et al. | 455/456.6 |
| 6,681,110 B1 | * | 1/2004 | Crookham et al. | 455/456.1 |
| 2003/0011467 A1 | * | 1/2003 | Suomela | 340/7.1 |

* cited by examiner

Primary Examiner—Brian Zimmerman
(74) Attorney, Agent, or Firm—Blakely, Sokoloff, Taylor & Zafman LLP

(57) ABSTRACT

A device is presented including a processor. A user interface is connected to the processor. A receiver is connected to the processor for receiving current location information from an external source. Also, a transmitter is connected to the processor for transmitting the current location information and command data to an external receiver. Also presented is a system including a processor connected to a transmission medium. A first receiver is connected to the processor. A first transmitter is also connected to the processor. A second transmitter transmits location data. A remote control (RC) including a RC receiver and a RC transmitter is included. The RC receives location data and sends command data and the location data to the first receiver. The first transmitter sends control information for at least one device located in a specific location according to the location data received by the RC.

6 Claims, 9 Drawing Sheets

| AREA/ROOM 1 | ... | AREA/ROOM N |

TV1
    TV1 COMMAND CODE 1
    •
    •
    •
    TV1 COMMAND CODE N
VCR1
    VCR COMMAND CODE 1
    •
    •
    •
    VCR COMMAND CODE N

CE DEVICE 1
    CE DEVICE 1 COMMAND CODE 1
    •
    •
    •
    CE DEVICE 1 COMMAND CODE N
CE DEVICE N
    CE DEVICE N COMMAND CODE 1
    •
    •
    •
    CE DEVICE N COMMAND CODE N

LOCATION 1
  USER 1
    FAVORITE SEQUENCE 1
      TV1 ON
      VCR1 OFF
      VOLUME 5/10
    FAVORITE SEQUENCE 2
      TV1 ON
      VCR1 ON
      VOLUME 6/10
      ⋮

FAVORITE SEQUENCE N
      TV1 OFF
      VCR OFF
  ⋮

USER N
    FAVORITE SEQUENCE 1
      TV1 ON
      VCR1 ON
      CHANNEL 5
      VOLUME 3/10
      ⋮

FAVORITE SEQUENCE N
      TV1 OFF
      VCR OFF

LOCATION N
  USER 1
    FAVORITE SEQUENCE 1
      STEREO ON
      VOLUME 6/10
      CHANNEL 967
      TV ON
      CHANNEL 00
      SATELLITE RECEIVER ON
      CHANNEL 39
      ⋮

FAVORITE SEQUENCE N
      STEREO OFF
      TV OFF
      SATELLITE RECEIVER OFF
  ⋮

USER N
    FAVORITE SEQUENCE 1
      SATELLITE RECEIVER ON
      CHANNEL 39
      TV ON
      CHANNEL 00
      STEREO OFF
      ⋮

FAVORITE SEQUENCE N
      STEREO OFF
      TV OFF
      SATELLITE RECEIVER OFF

FIG. 8

LOCATION 1 ... LOCATION N
    USER 1                                          USER 1
        RESTRICTIONS                                    RESTRICTIONS
            TV1 ACCESS DENIED 3PM-7PM                       TV1 ACCESS DENIED 7PM-6AM
            CHANNEL ACCESS 00-28 OK                         CHANNEL ACCESS 29-300 DENIED
            CHANNEL ACCESS 29-300 DENIED                    CHANNEL ACCESS 00-28 OK
            VCR ACCESS DENIED 3PM-7PM                       DVD ACCESS DENIED

USER 2                                           ⋮
        RESTRICTIONS
            NONE                                     USER N
                                                        RESTRICTIONS
    ⋮                                                       ALL DEVICES DENIED

USER N
        RESTRICTIONS
            NONE

FIG. 9

METHOD AND APPARATUS TO LOCATE A DEVICE IN A DWELLING OR OTHER ENCLOSED SPACE

BACKGROUND OF THE INVENTION

1. Field of the Invention

This invention relates to consumer electronics, and more particularly to a method and apparatus for determining location of a control device in an area and controlling other devices based on the determined location.

2. Description of the Related Art

For many consumer electronic (CE) products, various types of remote controls exist to control the specific CE device. Many CE devices have a one-to-one correspondence of remote control to CE device. Many CE devices, however, have a remote control device that can control more than one CE device. FIG. 1 illustrates this type of control device. In the example illustrated in FIG. 1, remote control 1 (RC1) 105, is capable of controlling television 1 (TV1) 125 and videocassette recorder 1 (VCR1) 130. RC2 110 is capable of controlling TV2 135 and digital versatile disc 1 (DVD1) 140. Also illustrated in FIG. 1, RC3 115 only controls stereo 1 150, and RC4 120 is capable of only controlling TV3 145.

In view of the many CE products purchased by users, it becomes apparent that a typical modern household may contain a plurality of RC devices for all the CE products. Therefore, universal RCs were developed to control many CE products and replace the many associated remote controls. FIG. 2 illustrates universal RC (URC) 200. In the example illustrated in FIG. 2, URC 200 replaces RC1 105, RC2 110, RC3 115, and RC4 120, which are illustrated in FIG. 1. A device such as URC200, however, needs to either be programmed beforehand with control code information for each specific device, or programmed/trained for each CE product that it is to control. Further, as illustrated in FIG. 2A, multiple URCs may each control a group of CE devices. FIG. 2A illustrates three URCs (URC1 200, URC2 250, and URC3 260) that control three groups of CE products.

With either a single URC or group of URCs, the control codes are typically transmitted from the URC via radio frequency (RF) or infrared (IR) signals. Also, the various CE products are typically maintained in separate rooms. With some transmission means, for example RF, penetration through a wall may be a capability. For IR transmission signals, however, the control codes are mainly limited to transmission within a single room or boundary (i.e., bounded by a wall). Also, RF transmitted signals are typically limited to a specific distance. Therefore, whether a single URC or group of URCs are kept to control a plurality of CE products, the complexity still exists for many users of knowing which remote control controls which group, or which control mechanism (such as buttons on a remote control) control which devices, and in which specific room.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 8 illustrates an embodiment of the invention for how a sequence of events can be organized/stored hierarchically.

FIG. 9 illustrates an embodiment of the invention for how restrictions to specific users in certain locations can be hierarchically organized/stored.

DETAILED DESCRIPTION OF THE INVENTION

The invention generally relates to a method and apparatus for locating a device in a dwelling or enclosed space. Referring to the figures, exemplary embodiments of the invention will now be described. The exemplary embodiments are provided to illustrate the invention and should not be construed as limiting the scope of the invention.

Figure 1:
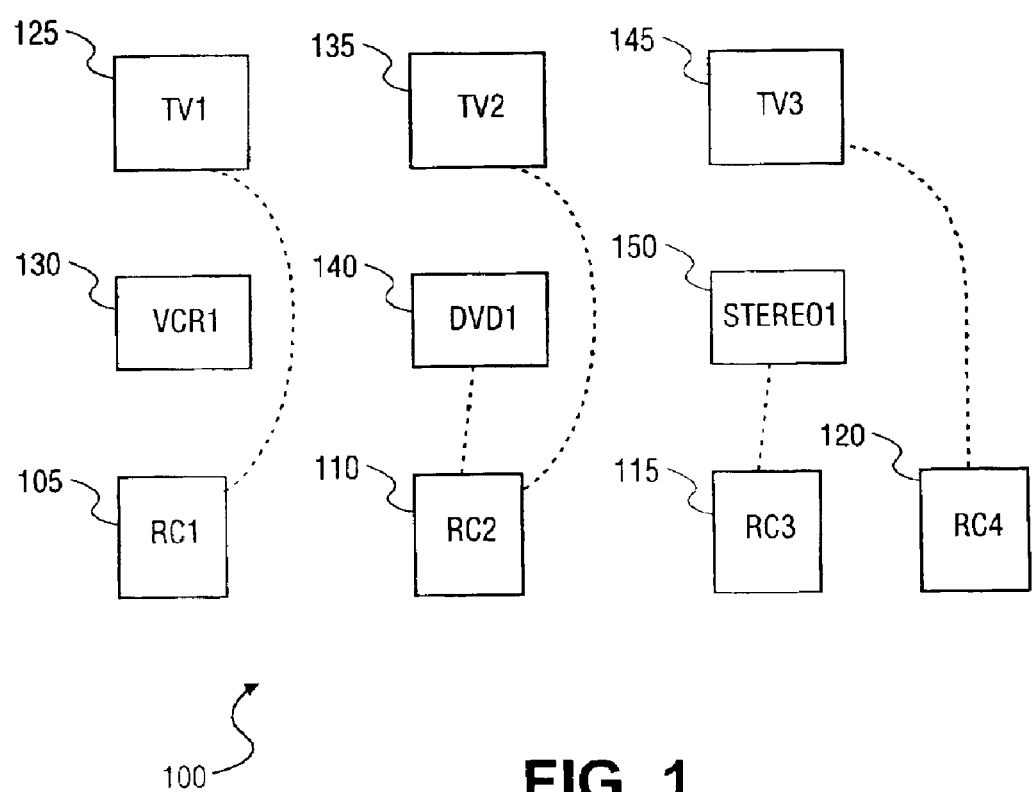
FIG. 1 illustrates remote control devices that can control more than one device.
Figure 2:
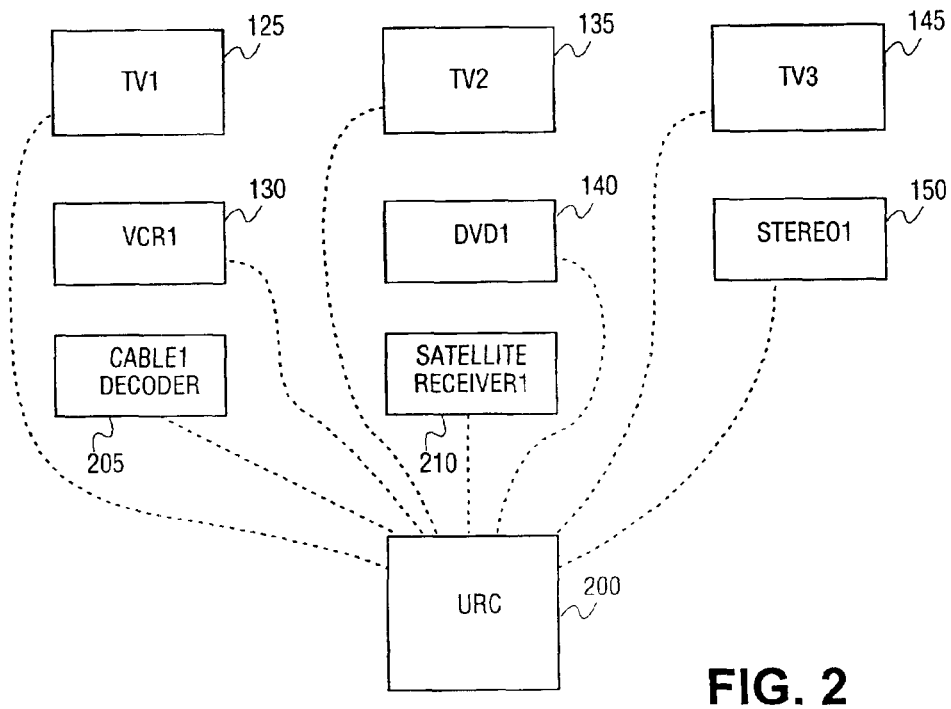
FIG. 2 illustrates a universal remote control device that can control many devices.
Figure 2A:
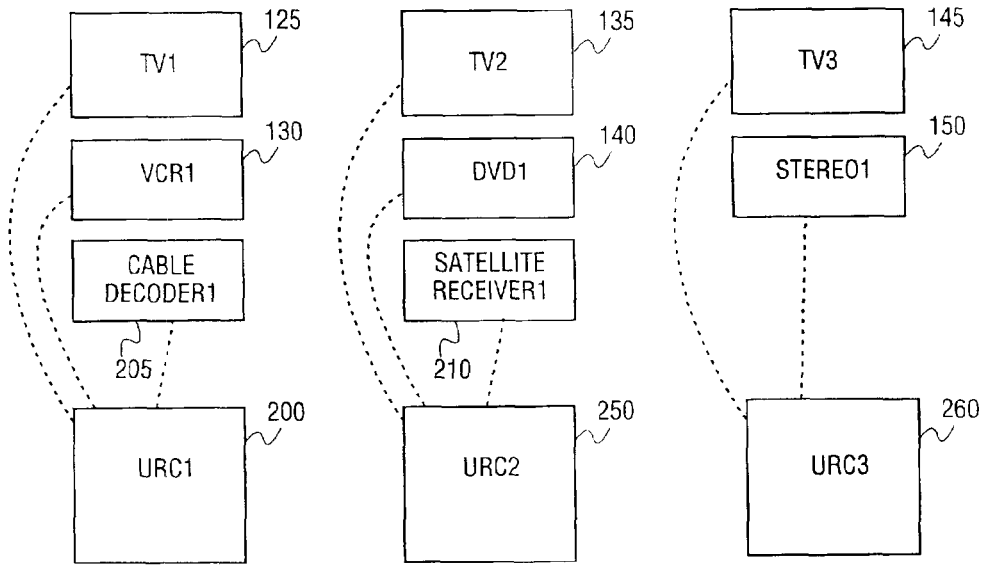
FIG. 2A illustrates a set of universal remote control devices that control sets of devices.
Figure 3:
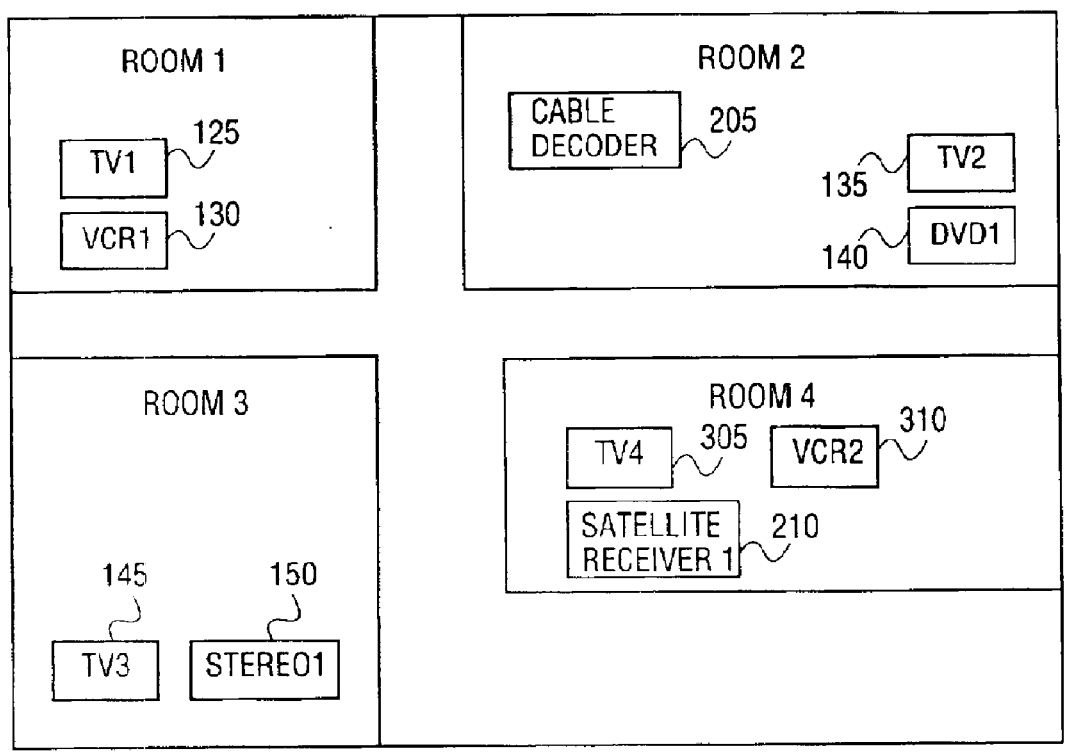
FIG. 3 illustrates a typical environment where consumer electronic (CE) devices are located in a plurality of areas/rooms.

FIG. 3 illustrates a typical environment 300 having four separate rooms/areas. A user of consumer electronic (CE) products, such as television 1 (TV1) 125, video cassette recorder 1 (CVR1) 130, (contained in room/area 1), cable decoder 205, TV2 135, digital versatile disk 1 (DVD1) 140 (contained in room/area 2), TV3 145, stereo 1 150 (contained in room/area 3), and TV4 305, VCR2 310, and satellite receiver 1 210 (contained in room/area 4) would need either a sophisticated universal remote control (URC), a plurality of individual remote controls (RC) or multiple URCs to control the plurality of CE products.

If a user has similar CE products, for example, if TV1 125 and TV2 135 are the same make and model, one RC can control both TV1 125 and TV2 135. A problem with this, however, is if a user in room 1 is using TV1 125 and another user in room 2 is using TV2 135, when either user 1 or 2 decides to enter a command on an RC for the specific TV they are using, the other TV could possibly be affected. This is because each RC does not have information regarding a specific location and/or device within a specific location.

Figure 4:
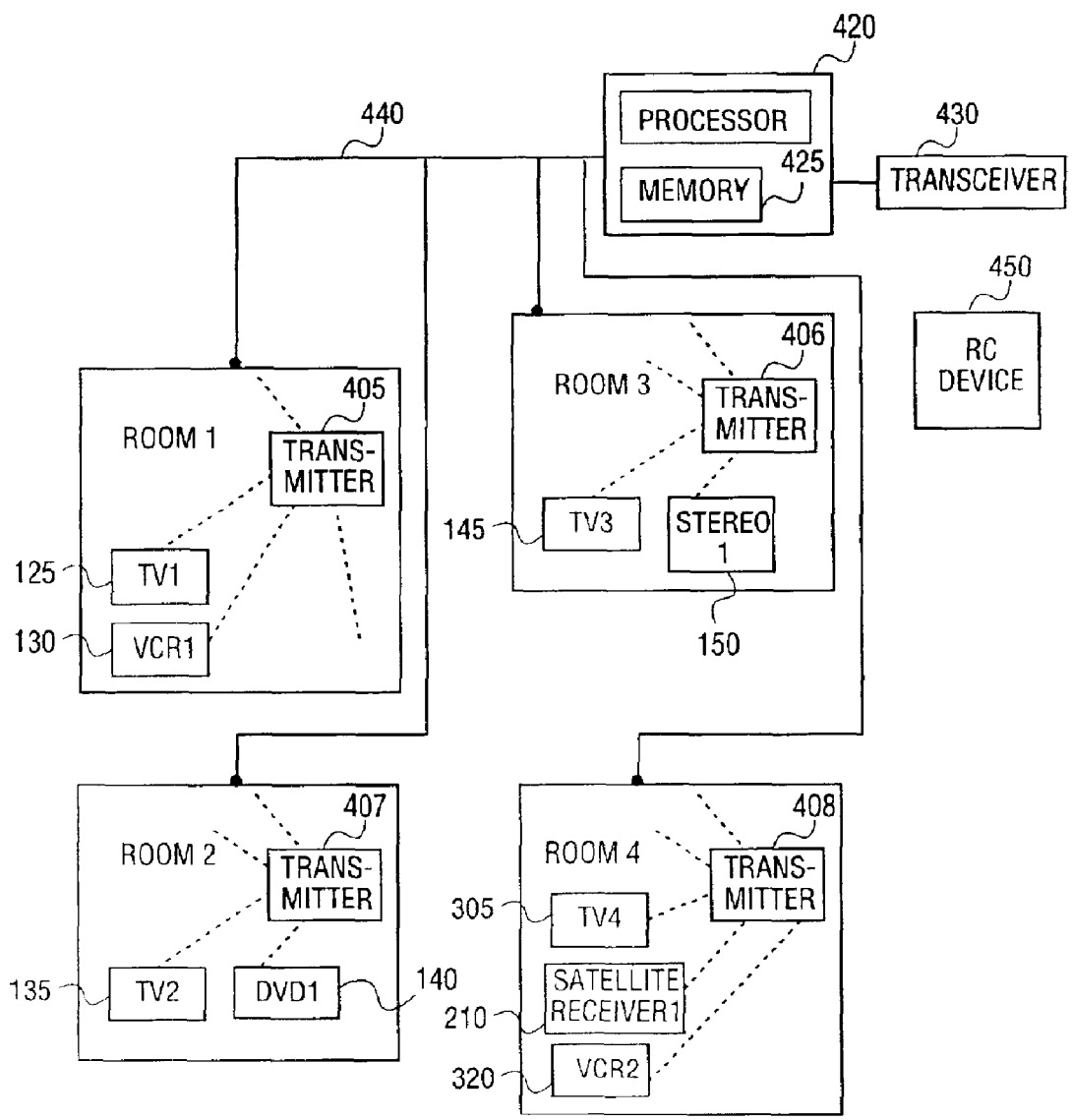
FIG. 4 illustrates an embodiment of the invention having a device to control CE devices based on a location.

FIG. 4 illustrates an embodiment of the invention including system 400. System 400 comprises transceiver 430, processor 420, memory 425, transmission medium 440, RC device 450, transmitters 405–408, and a plurality of CE devices (TV1 125, VCR1 130, TV2 135, DVD1 140, TV3 145, stereo 1 150, TV4 305, satellite receiver 1 210, VCR2 320) in a single environment, such as a dwelling, a vehicle, a building, etc. It should be noted that other CE devices could be included in system 400 without varying embodiments of the invention.

In one embodiment of the invention, transceiver 430 comprises Bluetooth™ standard (specification of the Bluetooth system version 1.1, Feb. 22, 2001) receiver and a Bluetooth™ standard transmitter. One should note, however, that other technologies could be used for transceiver 430 without varying from the scope of the invention. Transceiver 430 is used to transmit control commands to the plurality of CE devices in system 400, and receive control commands from RC device 450. Transmitter 405–408 transmits a location code that is specific to each area or room in system 400.

Transmitter 405 may be a limited radio frequency (RF) transmitter, an infrared (IR) bug, or similar transmission device. Transmission medium 440 is coupled to the plurality of CE devices in each area/room in system 400. Transmission median 440 may be coupled to a transmitter in each area/room, coupled directly to each CE device in each area/room or may be a wireless connection to a transceiver located in each area/room.

Transmission median 440 allows control commands to be carried out on the plurality of CE devices. Transmission median 440 may be comprised of a wireless network comprising IEEE 802.11 Standard (802.11, 1999/8802-11 (International Organization for Standardization/ International Electrotechnical Commission) (ISO/IEC) 8802-11:1999) IEEE Standard for Information Technology—(Local Area Network/Metropolitan Area Network) LAN/MAN—Specific requirements—Part 11: Wireless LAN Medium Access Control (MAC) and Physical Layer (PHY) specifications 1999), IEEE1394 standard (1394-1995 IEEE Standard for a High Performance Serial Bus—Firewire 1995) technology, Ethernet technology, or other means for coupling processor 420 to the plurality of CE devices, such as electrical wiring (e.g., X10), cellular technology, etc.

Figure 5:
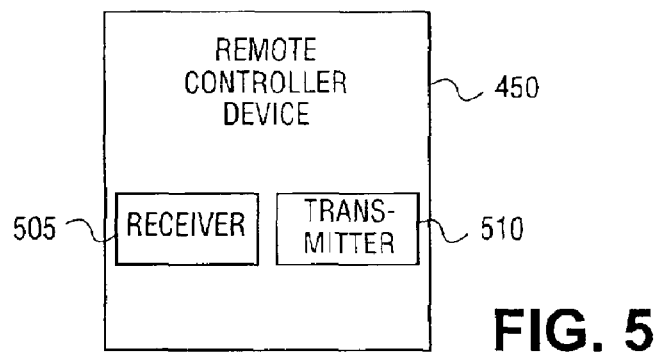
FIG. 5 illustrates an embodiment of the invention having a remote control device including a transmitter and a receiver for receiving location information.

FIG. 5 illustrates an embodiment of the invention having RC device 450. In one embodiment of the invention, RC device 450 comprises receiver 505 and transmitter 510. RC device 450 may comprise a user interface, such as push buttons, flat touch buttons, a touch screen, keyboard, etc. In one embodiment of the invention, RC device 450 may be a personal digital assistant (PDA). Receiver 505 receives control codes from transmitters 405–408. Each one of transmitters 405–408 transmits a specific code representing a specific area/room in which transmitter 405–408 is located. The location code transmitted by transmitters 405–408 can be a simple representation, such as a binary representation of a digit (e.g., room 1 is represented by "01", room 2 is represented by "02", etc.). When a user wishes to control the CE devices in room/area 1 (TV1 125 and VCR1 130), and is in room/area 1, RC device 450 by receiving the control code transmitted by transmitter 405 will know that it is located in room 1.

When a user selects to control TV1 125 via RC device 450, a user will select a command via the user interface on RC device 450 (e.g., TV on, channel number, volume, etc.). RC device 450 forms a packet including the location code received from transmitter 405 and the control code for the specific command that the user wants to occur. The packet of data is then transmitted and received by transceiver 430.

Processor 420, having memory 425, includes control command codes for each of the plurality of CE devices in system 400. The control codes for each specific CE device are stored in memory 425. Processor 420 may be a device such as a personal computer (PC) system, set top box (STB), etc. In one embodiment of the invention, control codes for specific CE devices are downloadable either via a network connection (e.g., the Internet), compact disk read-only memory (CD-ROM), telephone lines via a modem, communicated by a universal plug-and-play technology (e.g., CEBus HomePnP™) or learned/trained by a device such as a URC.

For each room/area, a user can set up which CE devices are to be located within the room/area on processor 420. Therefore, when processor 420 receives the packet from remote controller device 450 comprising location code and control command code, processor 420 will transmit back to transceiver 430 via appropriate control command for the CE devices within the room/area. When a user decides to change rooms/areas, the user travels to the desired area/room with RC device 450.

While the user is in the next desired room/area, one of transmitters 405–408 that is continuously transmitting a location code, will give the location code information to the RC device 450. Therefore, remote controller device 450 will know exactly which room/area it is located in. Thus, when a user selects a specific CE control command to execute, the new room/area code and data packet containing the control command that the user wishes to execute is sent to transceiver 430. Processor 420, based on the location code received, will know which specific CE device is to be controlled.

Figures 6, 7:
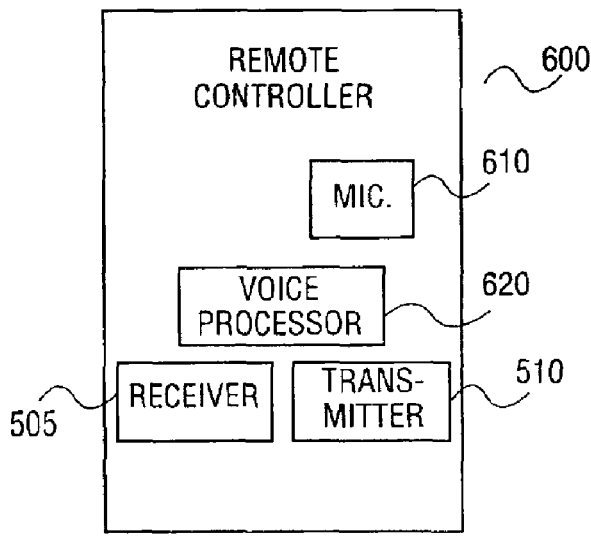
FIG. 6 illustrates an embodiment of the invention having a RC device including a microphone and a voice processor.
FIG. 7 illustrates an embodiment of the invention for how CE device commands may be hierarchically stored/organized via specific area/rooms.

FIG. 6 illustrates an embodiment of the invention having RC device 600. RC device 600 is similar to RC device 450, however, RC device 600 comprises microphone 610 and voice processor 620. RC device 600 receives user input via microphone 610. Voice processor 620 converts voice commands received through microphone 610 into a command packet. Therefore, a user can input desired control commands by speaking commands such as "TV on," "VCR off," "Volume up," etc. RC 610 then combines location code and control command data into a packet, which is transmitted via transmitter 510 to transceiver 430.

In one embodiment of the invention, receiver 505 and RC device 450 or 600 may use global positioning satellite (GPS) or cellular technology to determine location in an area/room. In this embodiment, transmitters 405–408 are not necessary since receiver 505 will receive the location information from outside of the system 400. In this embodiment of the invention, processor 420 will be more sophisticated in determining the location from the transmitted location data that is received by transceiver 430.

Additional set-up information will be required for information regarding specific rooms/areas for this embodiment using GPS technology. For example, for an embodiment including a GPS receiver within the RC device, location codes may need to be transmitted to transceiver 430 to be processed by processor 420 for four locations of an area/ room (e.g., four corners). In this case, a user can transmit the location information (latitude, longitude, altitude, as received on the GPS receiver) from four points in the room, which are then stored in memory 425 within processor 420. The user would then repeat the same sequence for each room. The processor would then be able to determine which room/area a user was located in via the received location information (e.g., latitude, longitude, and altitude). For adjoining rooms/areas, more locations within the room may need to be transmitted due to the proximity of the location information. In larger environments, such as a mansion, a RC device having a GPS receiver can eliminate the cost of having a plethora of location transmitters. Also, in certain areas where satellite reception may not be strong, additional equipment may be necessary, such as exterior antenna or dish.

In one embodiment of the invention, an additional GPS receiver is fixed at the location of processor 420. A reading takes place at the GPS receiver co-located at processor 420 at the same time the location information is received by receiver 505. The difference in location information (i.e., altitude, latitude and longitude) between the fixed GPS receiver and receiver 505 will yield a relative difference. This relative difference remains constant independent of any inaccuracy of the absolute location. Therefore, the determination of the boundary/room will be highly accurate.

FIG. 7 illustrates how CE device commands may be organized/stored via a specific area/room hierarchy according to one embodiment of the invention. As illustrated in FIG. 7, each specific area/room is comprised of a CE device or devices. Each CE device(s) is associated with specific command codes for that CE specific device.

In one embodiment of the invention, a user may program processor 420 in able to command a specific sequence of commanded events. For example, a first user may typically set the CE devices located in room 4 as follows: TV4 on, volume set to 5/10, channel set to 29, VCR2 320 set to off, and satellite receiver 1 210 set to on. Therefore, in this embodiment of the invention a user may select a favorite setting to be executed. In this embodiment of the invention, the remote control device 450 or 600 will be used to enter the specific command for the favorite sequences to occur. In one embodiment of the invention, the sequence of events can be organized/stored in a hierarchy on processor 420 as illustrated in FIG. 8. In one embodiment of the invention, the last entered sequence of events (e.g., volume setting, tone setting, device on/off, etc.) can be selected as a new sequence of events to be performed.

In one embodiment of the invention, the user can store favorite sequences on processor 420 via a user interface. A user interface may be such as a keyboard, a pointing device, or a voice activated processing system. For each location, a plurality of users can enter a plurality of favorite sequences. In one embodiment of the invention, a user is prompted to enter information for a CE device as a new device is added to the system. Also, if a device is moved from a room, the information for that device is removed from the room/area hierarchy and is temporarily stored in memory in case the device is connected within another room/area. If a CE device is moved, the user will be prompted whether a similar sequence is desired, allowing for different CE devices within the new room/area.

In one embodiment of the invention, restrictions for specific CE device "on/off" time limitations may be entered by a user with special privileges. A user with special privileges, such a parent, can limit certain times that specific CE devices may be used by specific users. The user with special privileges, can also set channel restrictions on television/satellite receivers, volume restrictions on certain CE devices, and time restrictions for which devices in which rooms may be commanded or turned off/on. A user with special privileges can be known by entering a certain password code, which may be a sequence of numbers, through RC device 450 or 600. Therefore, each user can have a separate password code for the same RC device.

Other devices that have remote control capabilities, such as curtains, fire places, ceiling fans, lights, dimmers, etc. may be controlled from remote controller device 450 or 600. Therefore, a user can program a favorite sequence of events for each specific room, which can include setting room moods, and preferences. For example, a user can select for room/area 1 to have the lights dimmed to half intensity, curtains closed, stereo volume set to low, TV turned on and set to a specific channel, etc. In one embodiment of the invention, a favorite sequence of events can be varied based on the time of day. For example, a daytime sequence may open curtains, turn off lights, and set devices and volumes to a day-time level; a night-time sequence may open curtains, turn on lights, and set device and volumes to a night-time level. Also, a favorite sequence can change with the time of year, such as winter versus summer settings.

When a person with special privileges, such as a parent, programs processor 420 for a user without special privileges, such as a child, the parent can actually control which rooms, which devices, what times, what volume, etc. that can be accessed by the child. For example, if a parent did not want a child to use channels 20–69 on a satellite receiver in room/area 4 (as illustrated in system 400), when the child enters room/area 4 and enters a channel in the restricted zone, the RC device 450 or 600 can indicate to the child that access is restricted.

Also if a child is not allowed to watch TV in rooms/areas 1–3 between a certain set of hours, when the RC device 450 or 600 is located in rooms/areas 1, 2 or 3, when the child enters the command to turn the TV on, a "restricted" notification will be made through the RC device. The restricted notification, may be a flashing light, a text note, a voice command through a small speaker, or a tone. In one embodiment of the invention, the notification can be made through a stereo device, a television, sequence of light flashes from lamps, etc.

FIG. 9 illustrates how the embodiment of the invention can be hierarchically organized/stored to give restrictions to specific users in certain locations. It should be noted that a user with special privileges can program processor 420 with restrictions/accesses for specific users in specific locations, and view the programmed restrictions/accesses for each user in specific locations, and favorite sequences (as illustrated in FIG. 8) on a monitor device coupled with processor 420. Another embodiment of the invention, the specific programmed restrictions/accesses/favorites can be viewed on a RC device, such as a PDA.

In one embodiment of the invention, a user can circumvent the specific location that they are located within by entering a command via RC device 450 or 600. By using this type of command, other control commands may be activated in other areas/rooms. For example, if a user travels to a first room/area, and forgot to turn off CE devices (e.g., lights, TV, VCR, cable decoder, etc.) in a room/area at a good distance from the current location, the user can override the received location code and enter the location code and sequence and/or commands to be executed in the other room/area. In one embodiment of the invention, devices in other locations can be controlled by a favorite sequence of events. For example, a user may have a "bedtime" sequence that turns off all the lights, devices, turns on the alarm system, shuts the garage door, etc.

Figure 10:
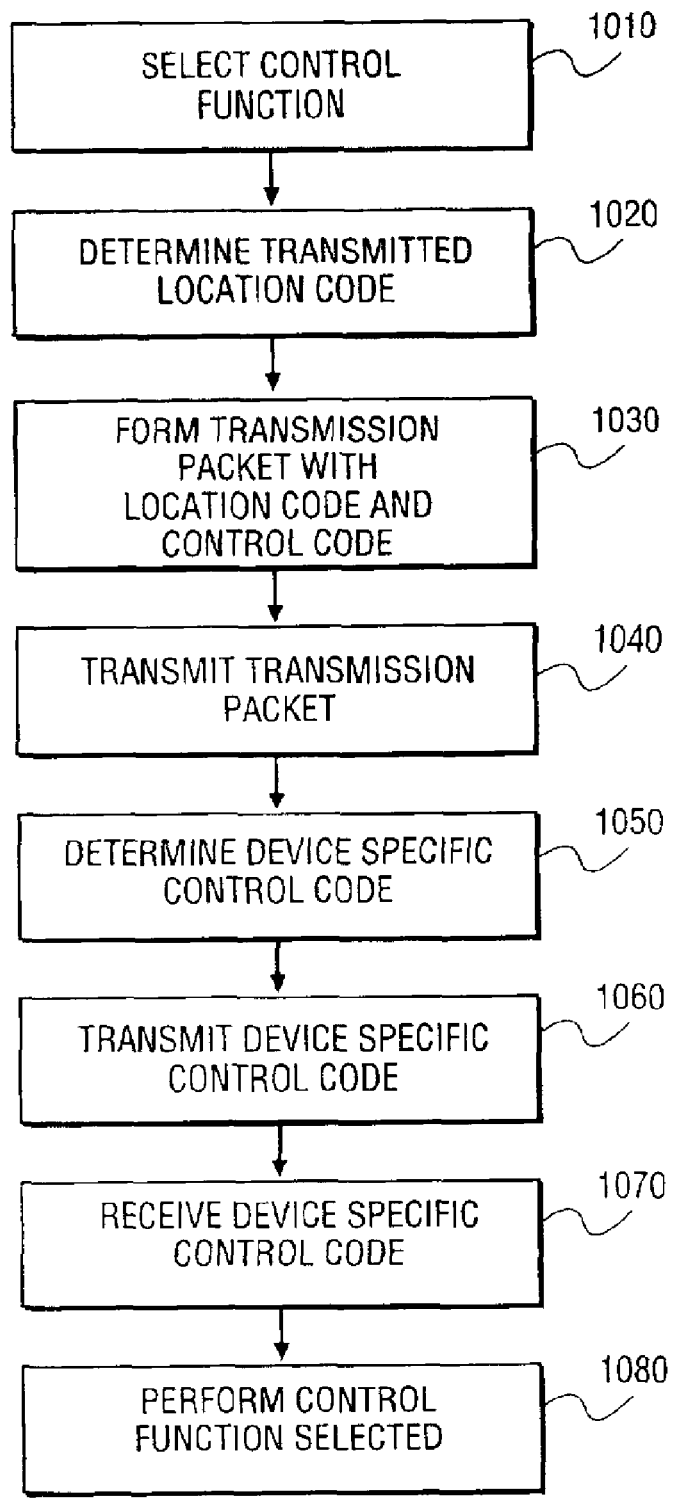
FIG. 10 illustrates a block diagram of an embodiment of the invention.

FIG. 10 illustrates a block diagram of an embodiment of the invention. Process 1000 begins with block 1010 where a user selects a control function on a RC device. Block 1020 then determines the transmitted location code from a transmitter, such as transmitters 405–408 illustrated in FIG. 4. In block 1030, the remote controlled device forms a transmission packet including the location code and control code for the selected function that the user has selected. In block 1040, the transmission packet is transmitted through the remote control device to a transceiver, such as transceiver 430.

Block 1045 receives the transmission packet at a transceiver, such as transceiver 430. In block 1050, based on the received location code and command code in the received transmission packet, the specific device control code is determined for the specific location.

Block 1060 then transmits the device specific control code to the specific location and to the specific device located in the location. In block 1070, the device specific control code is received. The device specific control code can be received either at the specific CE device, or a receiver/transmitter device located within the specific location. In block 1080, the user control function that was selected is performed on the CE device.

Figure 11:
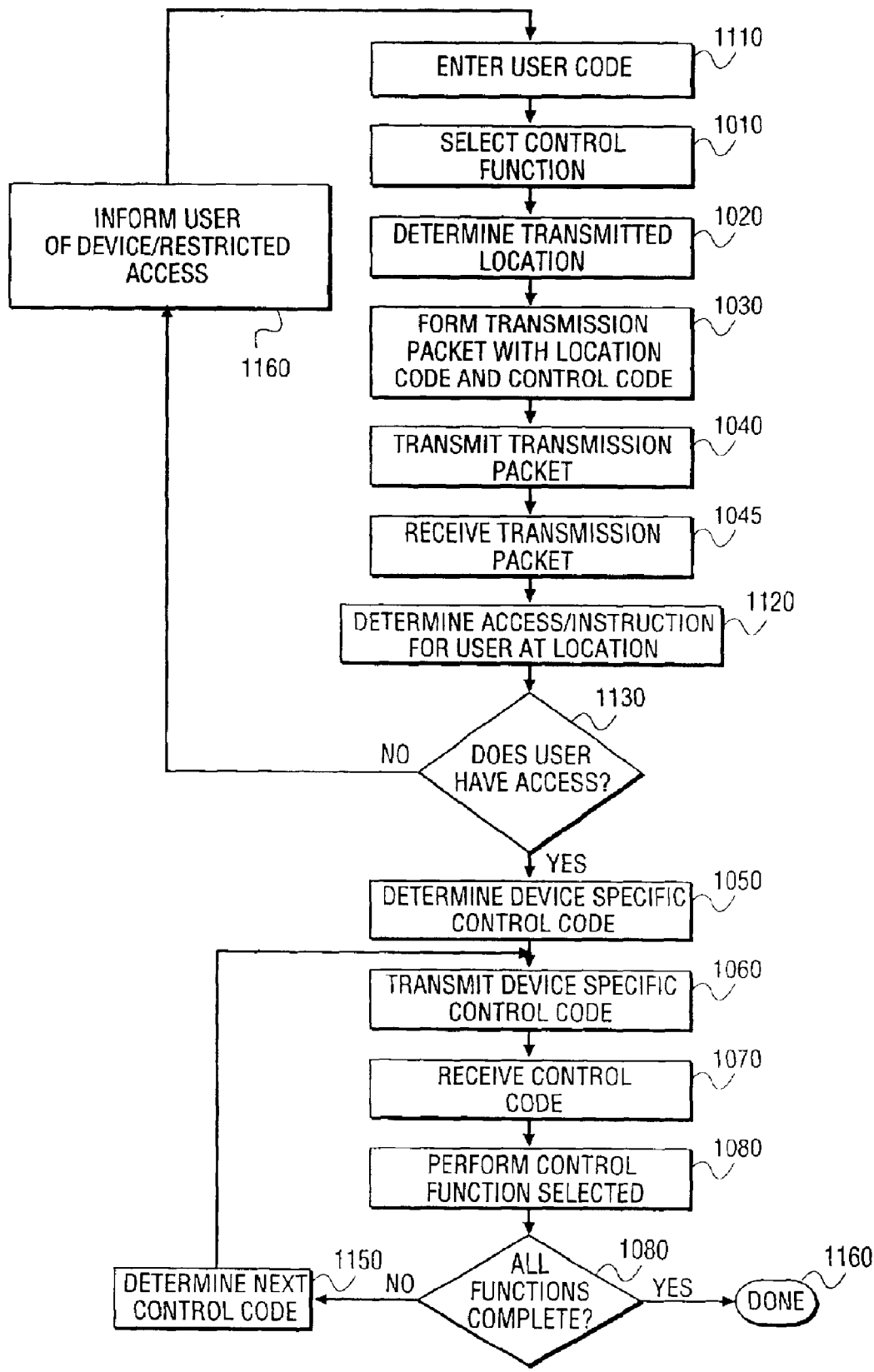
FIG. 11 illustrates a block diagram of an embodiment of the invention having access/restriction control.

FIG. 11 illustrates a block diagram of an embodiment of the invention having process 1100. Process 1100 begins with block 1110 where a user can enter a specific password code. Blocks 1010–1045 are the same as previously discussed in reference to process 1000 illustrated in FIG. 10.

After block 1045 has completed, process 1100 continues with block 1120 where the access/restriction for location and specific CE devices for the specific user is determined. Block 1130 determines whether the specific user has access (privilege) or is restricted from completing the selected control function. If block 1130 determines that the user does have access, then process 1100 continues with block 1050. If block 1130 determines that the user does not have access (is restricted), process 1100 continues with block 1160. Block 1160 informs the user of the denied or restricted access for the specific entered command for the specific location.

In block 150, the device specific control code is determined. Process 1100 continues with block 1060–1080 as previously discussed in reference to process 1000 illustrated in FIG. 10. After block 1080 is complete, process 1100 continues with block 1140, where it is determined whether all the functions have completed for the selected control function of the user (for sequences of control functions, e.g., user 1's favorites in location 1, etc.). If block 1140 determines that all functions are complete, process 1100 completes with block 1160. If block 1140 determines that all control functions are not complete, process 1100 continues with block 1150, which determines the next control code in the sequence. Process 1100 then continues with block 1060 and the process groups until all control codes are performed in the selected sequence.

The above embodiments can also be stored on a device or medium and read by a machine to perform instructions. The device or median may include a solid-state memory device and/or a rotating magnetic or optical disk. The device or median may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:

a processor;

a user interface coupled to the processor;

a receiver coupled to the processor for receiving current location information from an external source; and a transmitter coupled to the processor for transmitting the current location information and command data to an external receiver, wherein the receiver receives location information from an infrared (IR) device.

2. The apparatus of claim 1, wherein the user interface comprises one of a touch screen, a plurality of buttons, a personal desk assistant (PDA) and a keyboard.

3. The apparatus of claim 1, wherein the receiver is one of an infrared (IR) receiver, a radio frequency (RF) receiver and a global positioning satellite (GPS) receiver.

4. The apparatus of claim 1, wherein consumer electronic (CE) devices are commanded and controlled.

5. The apparatus of claim 1, further comprising:

a microphone coupled to the processor.

6. The apparatus of claim 5, wherein the processor converts voice data into command data.

* * * * *